United States Patent [19]
Hed

[11] Patent Number: 5,624,521
[45] Date of Patent: Apr. 29, 1997

[54] METHOD OF HOLDING OPTICAL ELEMENTS WITHOUT DEFORMATION DURING THEIR FABRICATION

[76] Inventor: P. Paul Hed, 80 Milaw Ct., San Ramon, Calif. 94583

[21] Appl. No.: 226,765

[22] Filed: Sep. 21, 1993

[51] Int. Cl.$^6$ .......................... B32B 31/28; B32B 31/06; B32B 31/18; B32B 31/22
[52] U.S. Cl. ...................... 156/275.7; 156/154; 156/155; 156/273.7; 156/275.1; 156/275.5; 156/280; 156/291; 156/292; 156/295; 156/299; 156/344
[58] Field of Search ............................ 156/275.5, 275.7, 156/291, 295, 344, 99, 273.7, 154, 155, 275.1, 292, 299, 106, 107, 280

[56] References Cited

U.S. PATENT DOCUMENTS

| | | |
|---|---|---|
| 4,172,916 | 10/1979 | Watson . |
| 4,351,873 | 9/1982 | Davis . |
| 4,519,168 | 5/1985 | Cesna . |
| 4,927,480 | 5/1990 | Vaughan . |
| 4,990,208 | 2/1991 | Kano . |
| 5,380,387 | 1/1995 | Salamon et al. . |
| 5,399,220 | 3/1995 | Winslow . |

FOREIGN PATENT DOCUMENTS 3-259509  11/1991  Japan .

OTHER PUBLICATIONS

"Optical Activities In Industry", Frank Cooke Applied Optics, vol. 2 No. 9, pp. 978–979, Sep. 1963.

"Lens Blocking Method for Opticam", Robert Novak et al. 1992 Technical Digest Series, vol. 24, pp. 245–251.

"Ultraviolet Light Immobilized Lens Blocking Adhesive Peformance Quantified Using Polymer Analysis Techniques" Fred Caputo, et al. 1992 Technical Digest Series, vol. 24, pp. 252–263.

Primary Examiner—David A. Simmons
Assistant Examiner—M. Curtis Mayes
Attorney, Agent, or Firm—Townsend and Townsend and Crew LLP

[57] ABSTRACT

An improved method for securing and removing an optical element to and from a blocking tool without causing deformation of the optical element. A lens tissue is placed on the top surface of the blocking tool. Dots of UV cement are applied to the lens tissue without any of the dots contacting each other. An optical element is placed on top of the blocking tool with the lens tissue sandwiched therebetween. The UV cement is then cured. After subsequent fabrication steps, the bonded blocking tool, lens tissue, and optical element are placed in a debonding solution to soften the UV cement. The optical element is then removed from the blocking tool.

23 Claims, 5 Drawing Sheets

METHOD OF HOLDING OPTICAL ELEMENTS WITHOUT DEFORMATION DURING THEIR FABRICATION

GOVERNMENT RIGHTS

The United States Government has rights in this invention pursuant to Contract No. W-7405-ENG-48 between the United States Department of Energy and the University of California.

TECHNICAL FIELD

The present invention relates to the field of optics and, more specifically, to the fabrication of optical elements.

BACKGROUND OF THE INVENTION

Precision optical elements are a necessity in many different fields including high powered laser research, astronomy, and numerous other commercial and military areas. Unfortunately, many of the current optical element fabrication techniques, in which the optical element is held or secured to a blocking plate during the fabrication of the optical element, often result in deformation of the optical element. One of the current techniques used to hold the optical element during fabrication is referred to as "Cold-Blocking."

An example of one type of cold-blocking is set forth in the "Optical Activities in Industry" article by Frank Cooke published in *Applied Optics*, Vol. 2, No. 9, pages 978–979, September 1963. In the article, a glass base plate is covered by a layer of a double-sided tape. Mirrors are then mounted on the base plate with the double-sided tape holding the mirrors in place during grinding, lapping, and polishing. After the machining of the mirrors is completed, the mirrors are removed from the glass base plate and the double-sided tape. However, as stated in the Cooke article, this technique only functions well for "moderately accurate parts."

More recently, cold-blocking techniques have been developed for use with very accurate and high aspect ratio parts. High aspect ratio elements are commonly defined as those optical elements having a thickness to diameter ratio of greater than about 1:5. These techniques typically involve the use of one of two kinds of cold adhesive. The first of the two types is a thermosetting adhesive. The thermosetting adhesive is applied to the surface of a blocking tool similar to the base plate of the Cooke article. The optical element is placed on the blocking tool with the layer of thermosetting adhesive located between the tool and the element. After the thermosetting cures, the blocked optical element is machined, that is, grinded, lapped, and polished. The blocked element is then subjected to a debonding solvent, and the blocked element is removed from the tool. Unfortunately, due to the shrinkage coefficient of the thermosetting adhesive, the adhesive tends to cause deformation of the optical element as the adhesive cures thereby rendering the optical element unsuitable for precision applications.

The second type of adhesive frequently used in cold-blocking is a UV cured adhesive. The use of such UV adhesives was considered and discussed during an Optical Fabrication & Testing Workshop sponsored by the Optical Society of America held in Boston, Mass. from Nov. 17–19, 1992. A paper entitled "Lens Blocking Method for Opticam" by Robert Novak et al. published in the 1992 Technical Digest Series, Vol. 24, at pages 245–251, discussed a specific type of cold blocking employing a UV adhesive, and a specially designed blocking tool. However, the blocking tool described in the Novak et al. article does not allow for simultaneous blocking of multiple optical elements. Furthermore, the device set forth in the Novak et al. article does not provide support to the entire surface of the blocked element. Instead, the device of the Novak et al. article only provides peripheral or edge located support to optical elements placed thereon.

A second paper dealing with cold-blocking and the use of UV adhesives entitled "Ultraviolet Light Immobilized Lens Blocking Adhesive Performance Quantified Using Polymer Analysis Techniques" by Fred Caputo et al. was also published in the 1992 Technical Digest Series, Vol. 24, at pages 252–263.

As set forth in the above-mentioned articles, typically, a layer of the UV adhesive is applied to the top surface of the blocking tool, and the optical element to be blocked is placed on the blocking tool. The block, that is, the blocking tool along with the blocked optical element, is then exposed to ultra-violet light. The UV adhesive cures when exposed to the ultra-violet light thereby securing the optical element to the blocking tool for subsequent machining of the blocked element. The blocked element is then subjected to a debonding solvent, and the blocked element is removed from the tool. Unfortunately, due to nature of the UV adhesive, and the fact that the solvent must penetrate between the blocking tool and the optical element and completely through the layer of the UV adhesive the block must soak for in the solvent from several days to several weeks. Thus, the extended deblocking time renders the use of UV adhesives cumbersome.

Additionally as the layer of optical adhesive cures, a strain is produced on the blocked optical element. The strain can result in deformation of the blocked element. Thus, high aspect ratio optical elements are particularly susceptible to deformation caused by the strain generated during curing of the UV adhesive.

All types of optical blocking have several requirements in common. The optical adhesive must be easy to apply and must not cause deformation of the blocked optical elements. Furthermore, it is desired that the blocked element may be easily removed or "deblocked" after subsequent machining of the blocked optical element.

Consequently, as the technological demands for very precise optical elements increase, a need exists for a technique to hold optical elements during their fabrication without causing deformation, which does not require excessive deblocking times, and which can be used with very accurate and high aspect ratio optical elements.

SUMMARY OF THE INVENTION

It is therefore an object of the present invention to provide an improved easy to use deformation-free blocking method for holding optical parts during their fabrication which does not require excessive deblocking times. This object has been accomplished by using several spots, referred to as dots, of UV cement to attach the optical element to the blocking tool.

In one embodiment of the present invention, a lens tissue is placed on the top surface of a blocking tool. Next, dots, or very small areas, of UV cement are applied to the lens tissue such that none of the dots contact each other. An optical element is then placed on top of the blocking tool with the lens tissue sandwiched therebetween. In so doing, the optical element is not subjected to the strains generated by an entire layer of UV cement during curing.

The block is then exposed to a source of ultra-violet illumination thereby curing the UV cement. After subsequent fabrication steps, the block is placed in a debonding solution to soften the UV cement. Due to the separation caused by the lens tissue, and the use of spaced apart UV cement dots, the solvent is able to easily and quickly pass between the tool and the element to cause rapid deblocking of the optical element.

In another embodiment of the present claimed invention, the optical element is placed on top of the blocking tool without the use of a separating lens tissue.

Finally, in either embodiment of the present claimed invention, that is, with or without the use of lens tissue, multiple optical elements having diameters which are substantially smaller than that of the blocking tool may be placed in a single layer on the blocking tool. Thus, the embodiments of the present claimed invention allow for simultaneous blocking of multiple optical elements on a single blocking tool.

In so doing, the present claimed invention is able to block single or multiple high precision and high aspect ratio optical elements and provide support for the blocked elements during subsequent machining without causing deformation of blocked elements. Additionally, the present claimed invention provides deblocking times on the order of 1-2 hours, as opposed to several days or several weeks as found in the prior art.

BRIEF DESCRIPTION OF THE DRAWINGS

The accompanying drawings which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
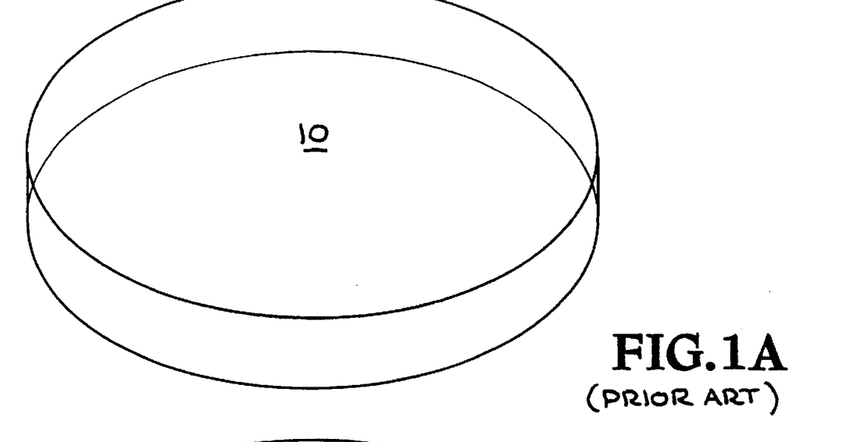
FIGS. 1A-C are perspective views of prior art steps used to block an optical element.

With reference now to Prior Art FIG. 1A, a perspective view of a blocking tool 10 used in the starting step of a prior art cold-blocking method is shown.

Figure 1B:
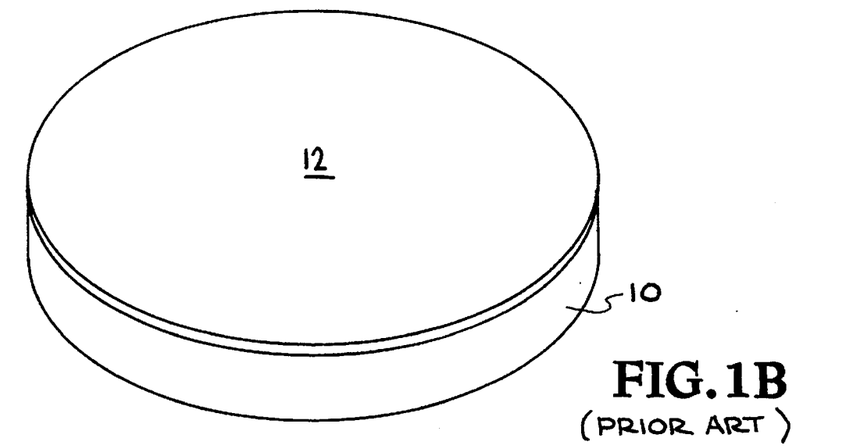
Figure 1C:
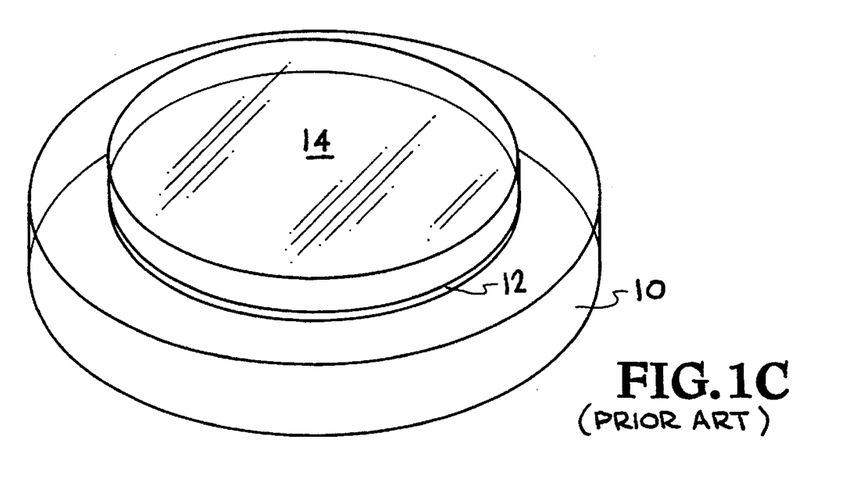

As shown in Prior Art FIG. 1B, a layer 12 of an optical adhesive is applied to the top surface of blocking tool 10. Layer 12 of optical adhesive covers the entire top surface of blocking tool 10.

referring now to Prior Art FIG. 1C, the next step used in a prior art cold-blocking method is shown. An optical element 14 is placed over blocking tool 10, such that layer 12 of optical adhesive is disposed between optical element 14 and blocking tool 10. In the prior art cold-blocking method, as optical adhesive layer 12 cures, the contraction of layer 12 tends to create stresses on optical element 14. These stresses, in turn, result in deformation of optical element 14 thereby rendering optical element 14 unfit for precision uses. Additionally, optical adhesive layer 12 typically only separates blocking plate 10 and optical element 14 by a distance of approximately 0.02 millimeters. This minute separation distance impedes the flow of solvent between blocking plate 10 and optical element 14.

Figure 1D:
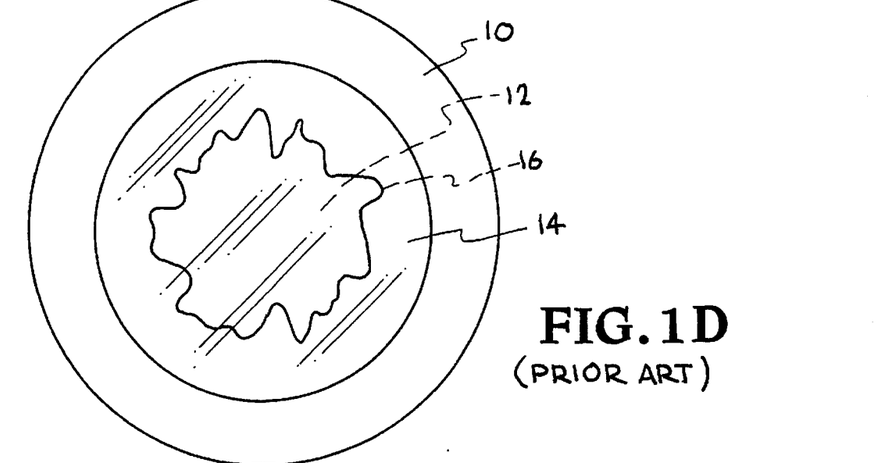
FIG. 1D is a top view of prior art FIG. 1C showing the intrusion of solvent towards the center of the block.

With reference now to Prior Art FIG. 1D, a top view of the prior art block of FIG. 1C is shown. As indicated by solvent line 16, the deblocking solvent must penetrate from the edges of blocking tool 10 and optical element 14 towards the center of the block. However due to the small separation distance between blocking tool 10 and optical element 14 the penetration of solvent may take from several days to several weeks. Thus, prior art cold-blocking methods require substantial deblocking times and may still produce deformed optical elements.

Figure 2A:
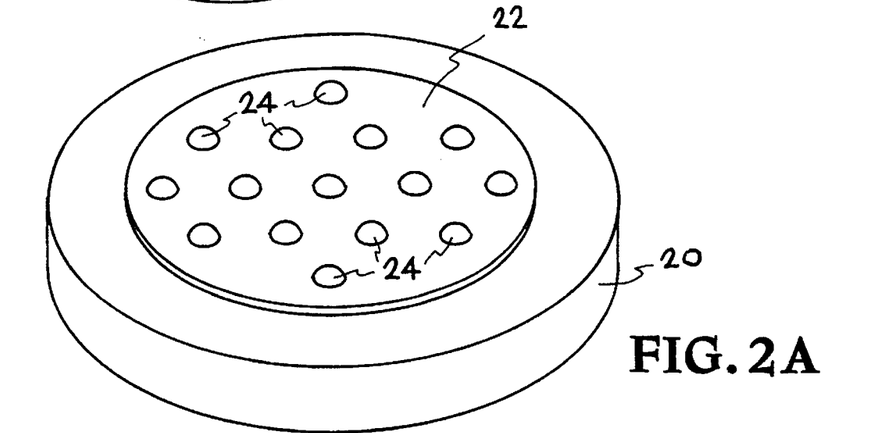
FIGS. 2A-C are perspective views of steps in the improved cold-blocking method in accordance with the present claimed invention.

With reference now to FIG. 2A, a step in the improved cold-blocking method of one embodiment of the present claimed invention is shown. A lens tissue 22 is placed over the top surface of blocking tool 20. Lens tissue 22 is formed of a porous material and has a thickness of approximately 0.05 millimeters. Although a 0.05 millimeter tissue is used in the present embodiment, the present claimed invention is also well suited to the numerous types of lens tissues well known in the art, and to various alternate thicknesses.

Referring still to FIG. 2A, dots 24 of optical adhesive are arranged on lens tissue 22 such that they do not contact each other. In the present embodiment, dots 24 are formed of a UV cement such as, for example NOA 65 produced by Norland products Inc. of New Brunswick, N.J. However, the present embodiment of the present claimed invention is also well suited to the use of other adhesives well known in the art. Additionally, the number and size of dots 24 applied to lens tissue 22 may be varied to accommodate various lens sizes or other variables.

Referring again to FIG. 2A, in the present embodiment, dots 24 of adhesive are applied to lens tissue 22 one at a time. However, the method of the present claimed invention is also well suited to cases where numerous dots are required. In such cases, the dots of adhesive are applied using a applicator which applies many or all of the desired dots simultaneously. As a result the tedious application of one adhesive dot at a time is eliminated.

With reference still to FIG. 2A, in addition to providing additional space between optical element 26 and blocking tool 20, lens tissue 22 also helps prevent scratches. Typically, blocking tool 20 and optical element 26 will have previously undergone some machining to provide them with smooth surfaces. By placing a layer of lens tissue 22 will further insure that impurities or particles which may reside, for example, on the surface of blocking tool 20 will not scratch optical element 26.

Figure 2B:
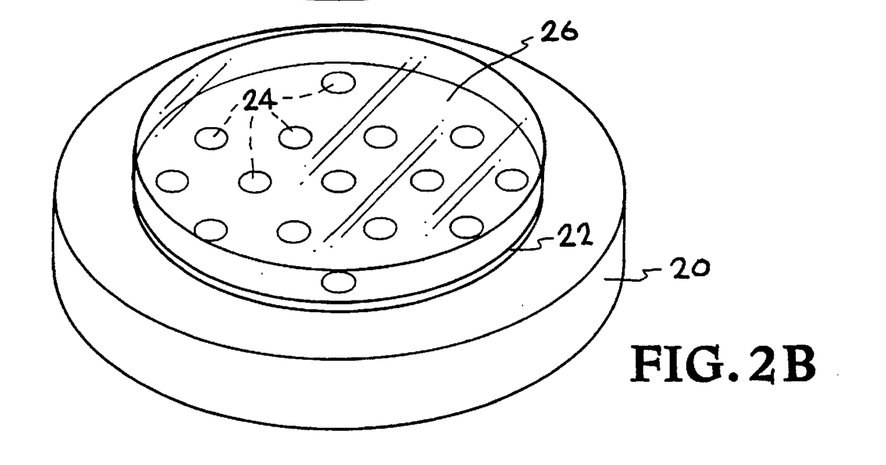

With reference now to FIG. 2B, an optical element 26 is then placed over lens tissue 22, dots of adhesive 24, and blocking tool 20. In the present embodiment of the claimed invention, optical element 26 is a circular window having a diameter of approximately 6 inches. However, the present claimed invention may also be used with numerous other types of optical elements well known in the art including optical elements having larger or smaller diameters. The method of the present embodiment of the claimed invention may also used with optical elements having non-circular dimensions. In such cases, the shape and dimensions of blocking tool 20 and lens tissue 22 are altered accordingly to correspond to the configuration of the optical element.

Referring again to FIG. 2B, after being placed on top of lens tissue 22, optical element 26 is pressed downwardly towards blocking tool 20. In so doing, a more uniform adhesion of optical element 26 to the block is insured.

Figure 3A:
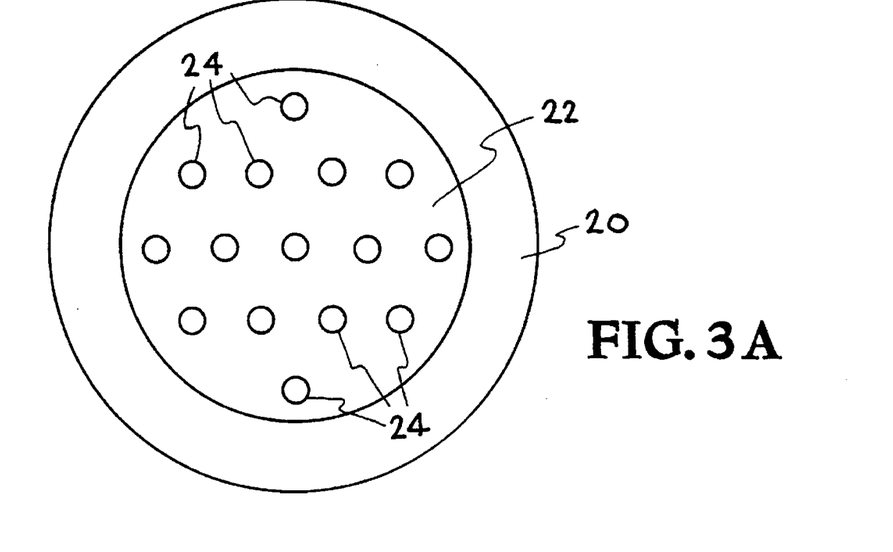
FIG. 3A is a top view of lens tissue 22 and dots 24 of FIG. 2A in accordance with the present claimed invention.
Figures 3B, 4:
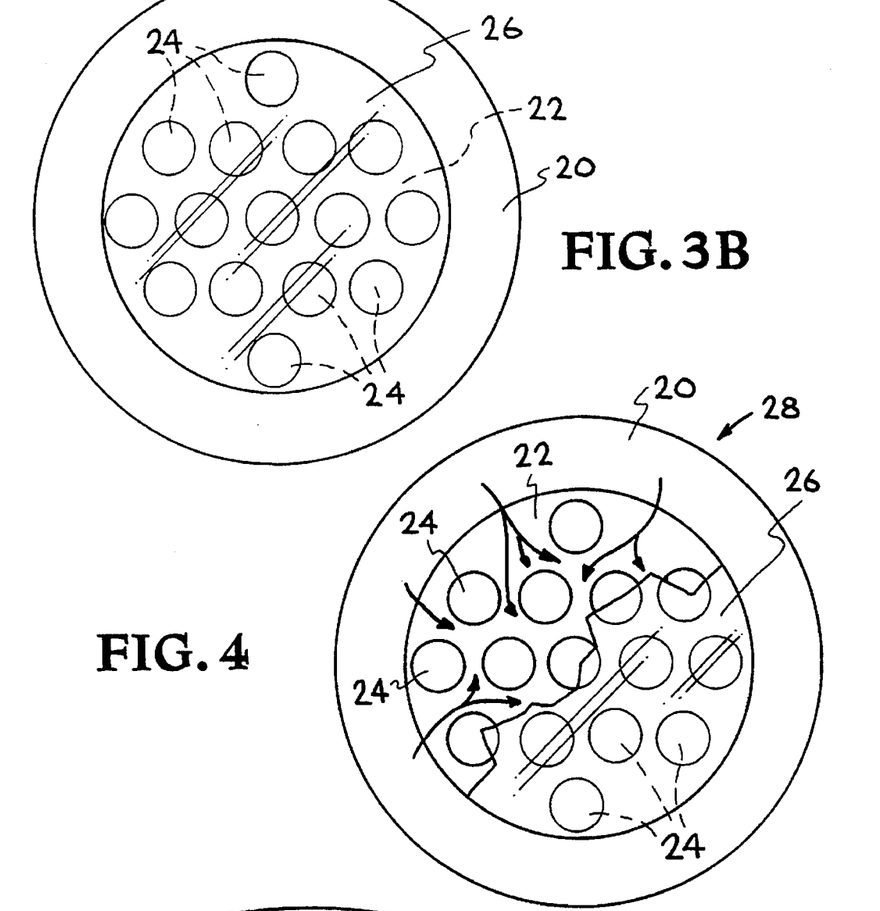
FIG. 3B is a top view of lens tissue 22 and dots 24 after optical element 26 has been placed on top of lens tissue 22 and dots 24 in accordance with the present claimed invention.
FIG. 4 is a top view of Block 28 of FIG. 2D with a portion of optical element 26 removed in accordance with the present claimed invention.

With reference now to FIG. 3A, a top view of lens tissue 22 and dots 24 of FIG. 2A is shown. In FIG. 3B, a top view of lens tissue 22 and dom 24, is shown after optical element 26 of FIG. 2B has been placed on top of lens tissue 22 and dots 24. As shown in FIG. 3B, dots 24 are separated by sufficient distances such that they do not contact each other even after they spread out due to the pressure of optical element 26 of FIG. 2B. As a further benefit of the present claimed invention, by using dots of UV cement, as opposed to a layer of adhesive as recited in the prior art, the present claimed invention eliminates shrinkage of the entire layer of adhesive towards the center of blocked optical element 26 of FIG. 2B. Instead, each of the dots of adhesive 24 are able to cure without producing considerable stress on optical element 26 of FIG. 2B. In so doing, deformation of optical element 26 of FIG. 2B is eliminated by the present claimed invention. Also, by using dots 24 of adhesive instead of an entire layer, the present claimed invention reduces the amount of adhesive required.

Figure 2C:
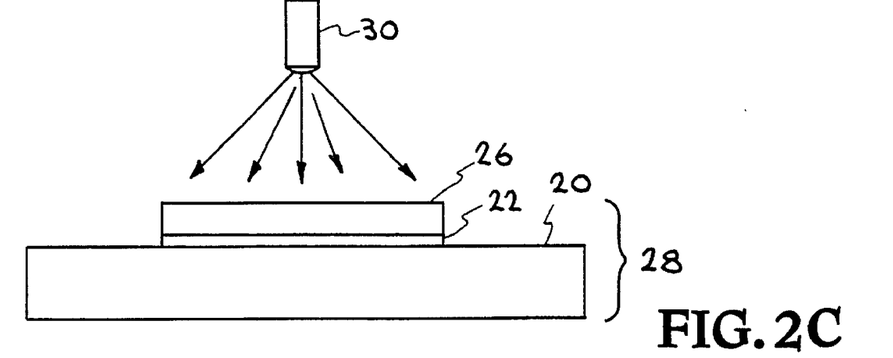

Referring next to FIG. 2C, the block 28 is exposed to an ultra-violet illumination source 30. Ultra-violet illumination source 30 may be a mercury lamp, a fluorescent black light, or any of the other numerous ultra-violet illumination sources well known in the art. Exposure to ultra-violet illumination source 30 causes dots 24, of FIG. 2A, to cure. In so doing a optical element 26 is bonded to blocking tool 20. In the present embodiment, block 28 is exposed to the ultra-violet illumination source for a period of approximately 30 seconds. However, the method of the present claimed invention also allows the exposure time to be varied as desired or is necessary.

Figure 2D:
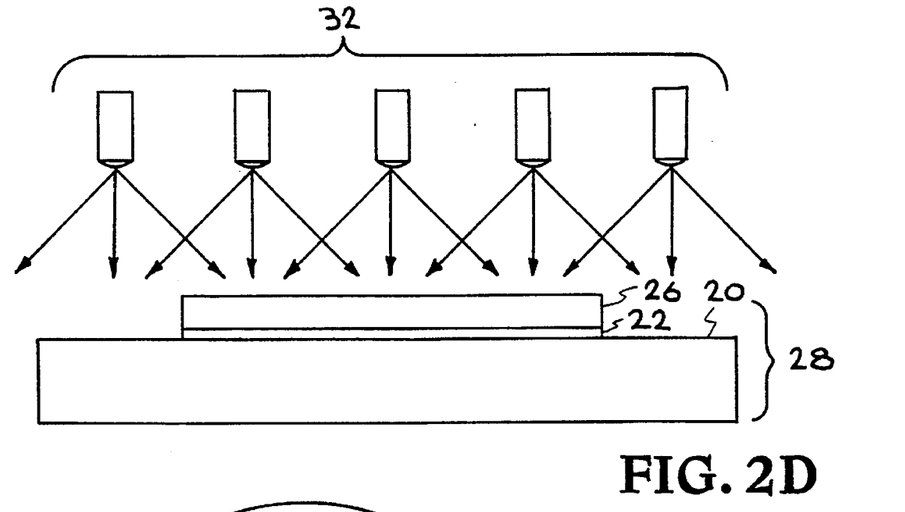
FIG. 2D is a perspective view of an alternate step in the improved cold-blocking method in accordance with the present claimed invention.

With reference now to FIG. 2D, in an alternate embodiment of the present claimed invention, and array 32 of ultra-violet illumination sources can also be used. By using an array 32 of illumination sources, a more uniform curing of dots 24 of FIG. 2B is realized. That is, array 32 eliminates any problems associated with shadows present on block 28 which may tend to hamper effective curing of the UV cement. The present claimed invention is also well suited to the use of a diffuser such as a ground fused silica window to further insure uniform curing of dots 24.

After block 28 of FIG. 2D has been exposed to the ultra-violet source, the edges of the block are covered with a lacquer or shellac, not shown. The shellac is applied to insure that fluids such as water which are present during subsequent grinding, lapping and polishing, do not enter the lens tissue layer and cause debonding of the block. After block 28 of FIG. 2D has been machined as desired, block 28 of FIG. 2D is placed in a solvent to induce deblocking of optical element 26 of FIG. 2B from blocking tool 20 of FIG. 2B. The solvent may be trichlorethylene, methylene chloride, or any of the other numerous solvents well known in the art.

Referring now to FIG. 4, a top view of Block 28 of FIG. 2D is shown with a portion of optical element 26 removed. As shown in FIG. 4, as block 28 is placed in a solvent solution, not shown, the solvent may flow between optical element 26 and blocking tool 20 of FIG. 2B, along, for example, paths indicated by the arrows. That is, dots 24 of UV cement of the present claimed invention allow for much easier intrusion of the solvent towards the center of block 28 as compared to the prior art. In the prior art, the solvent had to penetrate from the edges of the block through an entire layer of adhesive in order to reach the center of the block. However, in the present embodiment of the claimed invention, the solvent may penetrate or creep along lens tissue 22 towards the center of the block without having to pass through an entire layer of adhesive. Thus, by providing dots 24 of UV cement as opposed to an entire layer of cement, the solvent may penetrate, contact, and debond all areas or dots 24 of UV cement much more rapidly than was previously possible. In fact, in the present embodiment of the claimed invention, debonding times as low as 1–2 hours are easily attainable. These reduced bonding times are dramatically shorter than the several days to several weeks required in the prior art.

With reference still to FIG. 4, lens tissue 22 also enhances the penetration of solvent by increasing the separation between optical element 26 and blocking tool 20 of FIG. 2B. In the prior art separation between the optical element and the blocking tool is commonly as low as 0.02 millimeters. However, in the present embodiment of the present claimed invention, lens tissue 22 has a thickness of 0.05 millimeters. Thus, in addition to providing "adhesive free" paths for the solvent, lens tissue 22 of the present claimed invention also provides beneficial separation between optical element 26 and blocking tool 20 of FIG. 2B.

Figure 5:
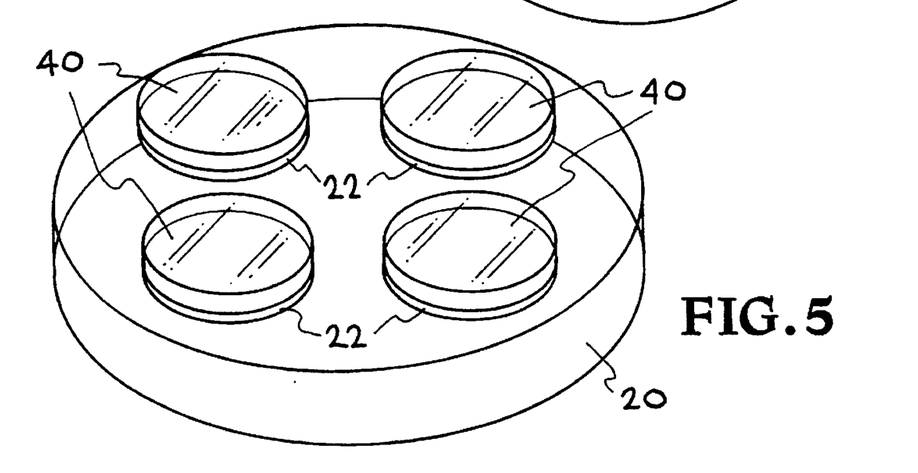
FIG. 5 is a perspective view of another embodiment of the present claimed invention is shown in which multiple optical elements 40 are attached to a blocking tool 20 in accordance with the present claimed invention.

Referring now to FIG. 5, another embodiment of the present claimed invention is shown in which multiple optical elements 40 are attached to blocking tool 20. Unlike prior art devices which employ a blocking tool such as is described in the paper entitled "Lens Blocking Method for Opticam" by Robert Novak et al., the present claimed invention provides support throughout the entire surface of each blocked optical element 40. That is, in the present claimed invention, blocking tool 20 does not merely provide support at the peripheral edges thereoff Therefore, unlike the prior art, in the present embodiment of the present invention as many small sized optical elements 40 can be fit in a single layer onto blocking tool 20, may be simultaneously blocked on blocking tool 20. In such instances, dots of UV cement, not shown, are applied only to the areas of lens tissue 22 where optical elements 40 will be attached.

With reference still to FIG. 5, where multiple optical elements 40 are attached to blocking tool 20, the edges of each of the optical elements 40 have a layer of lacquer or shellac, not shown, applied thereto. The shellac is applied to insure that fluids such as water which are present during subsequent grinding, lapping and polishing, do not cause debonding of the optical elements 40 from blocking tool 20. As in the previous embodiment, deformation of the optical elements 40 is prevented and reduced debonding times are achieved.

Figures 6A, 6B, 6C, 7:
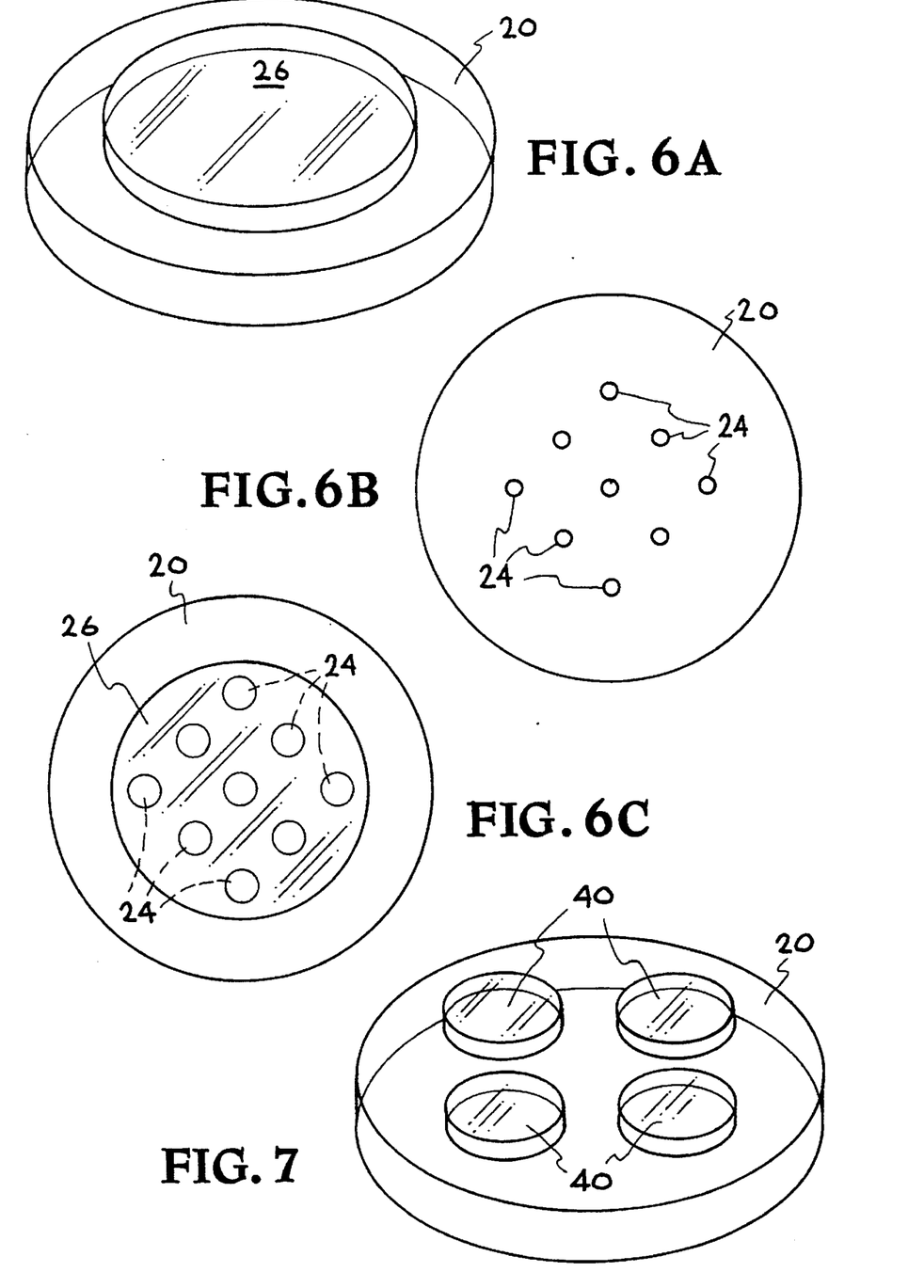
FIG. 6A is a perspective view in which an optical element 26 is attached directly to a blocking tool 20 without the use of a lens tissue in accordance with the present claimed invention.
FIG. 6B is a top view of FIG. 6A in which blocking tool 20 and dots 24 are shown in accordance with the present claimed invention.
FIG. 6C is a top view of blocking tool 20 and dots 24 after optical element 26 has been placed on top of blocking tool 20 and dots 24 in accordance with the present claimed invention.
FIG. 7 is a perspective view of another embodiment of the present claimed invention in which multiple optical elements 40 are attached to a blocking tool 20 without the use of a separating lens tissue in accordance with the present claimed invention.

Referring next to FIG. 6A, another embodiment of the present claimed invention is shown in which the optical element 26 is attached directly to the blocking tool 20 without the use of a lens tissue. In the present embodiment, drops or dots of UV cement, not shown, are applied directly to blocking tool 20. As in previous embodiments, the dots of adhesive, not shown, are applied one at a time. However, the method of the present claimed invention is also well suited to cases where numerous dots are required. In such cases, the dots of adhesive are applied to the surface of blocking tool 20 using a applicator which applies many or all of the desired dots simultaneously. As a result the tedious application of one adhesive dot at a time is eliminated. Curing of the UV cement is accomplished using an ultraviolet light source, not shown.

With reference now to FIG. 6B, a top view of blocking tool 20 with dots 24 of UV cement placed thereon is shown. In FIG. 6C, a top view of blocking tool 20 and dots 24, is shown after optical element 26 of FIG. 6A has been placed on top of blocking tool 20 and dots 24. As shown in FIG. 6C, dots 24 are separated by sufficient distances such that they do not contact each other even after they spread out due to the pressure of optical element 26 of FIG. 6A. By using dots 24 of UV cement, as opposed to a layer of adhesive as recited in the prior art, the present claimed invention eliminates shrinkage of the entire layer of adhesive towards the center of blocked optical element 26 of FIG. 6A. Instead, each of the dots of adhesive 24 are able to cure without producing considerable stress on optical element 26 of FIG. 6A. In so doing, deformation of optical element 26 of FIG. 6A is eliminated by the present claimed invention. Also, by using dots 24 of adhesive instead of an entire layer, the present claimed invention reduces the amount of adhesive required.

With reference again to FIG. 6A, in the present embodiment of the claimed invention, after attachment and curing of optical element 26 to blocking tool 20, a layer of lacquer or shellac, not shown, is applied to the edges of optical element 26 to insure that fluids such as water which are present during subsequent grinding, lapping and polishing, do not cause debonding of optical element 26 from blocking tool 20.

Referring again to FIG. 6A, in the present embodiment, during debonding of optical element 26 from blocking tool 20, the dots of UV cement, not shown, allow for much easier intrusion of the solvent towards the center of blocked optical element 26 as compared to the prior art. In the prior art, the solvent had to penetrate from the edges of the block through an entire layer of adhesive in order to reach the center of the optical element. However, in the present embodiment of the claimed invention, the UV cement solvent may penetrate or creep towards the center of optical element 26 without having to pass through an entire layer of adhesive. Thus, by providing dots UV cement, not shown, as opposed to an entire layer of cement, the solvent may penetrate, contact, and debond all areas or UV cement much more rapidly than was possible in the prior art.

Referring now to FIG. 7, yet another embodiment of the present claimed invention is shown in which multiple optical elements 40 are attached to blocking tool 20 without the use of a separating lens tissue. In such instances, dots of UV cement, not shown, are applied directly to blocking tool 20 only in the areas of blocking tool 20 where optical elements 40 will be attached.

With reference still to FIG. 7, where multiple optical elements 40 are attached to blocking tool 20, the edges of each of the optical elements 40 have a layer of lacquer or shellac, not shown, applied thereto. The shellac is applied to insure that fluids such as water which are present during subsequent grinding, lapping and polishing, do not cause debonding of the optical elements 40 from blocking tool 20. As in the previous embodiment, deformation of the optical elements 40 is prevented and reduced debonding times are achieved.

Therefore, the present claimed invention provides an improved deformation-free blocking method for holding optical parts during their fabrication which does not require excessive deblocking times, which provides support along the entire surface of the blocked element, and which allows multiple, optical elements to be blocked simultaneously on a single blocking tool.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An improved method of securing and removing a surface of an optical element to and from a surface of a blocking tool comprising the steps of:

placing a lens tissue on said surface of said blocking tool, applying a plurality of dots of an optical adhesive to said lens tissue such that said plurality of dots do not contact each other, placing the surface of said optical element on said lens tissue such that said lens tissue is disposed between said surface of said blocking tool and said surface of said optical element, applying pressure to said surface of said optical element such that said surface of said optical element is pressed towards said surface of said blocking tool, and such that said plurality of dots of said optical adhesive applied to said lens tissue spread out between said blocking tool and said optical element, said plurality of dots still not contacting each other, curing said plurality of dots of said optical adhesive such that said optical element is secured to said blocking tool during subsequent machining of said optical element, placing said blocking tool, said lens tissue, and said optical element in a debonding solution after said subsequent machining so that said cured plurality of dots of said optical adhesive are softened, removing said optical element from said blocking tool and said lens tissue.

2. The method as recited in claim 1 wherein said optical element is secured to and removed from said blocking tool without causing deformation of said optical element.

3. The method as recited in claim 1 further including the step of applying a protective coating around the edges of said optical element and said blocking tool such that fluid is prevented from contacting said lens tissue present along said edges of said optical element and said blocking tool.

4. The method as recited in claim 1 wherein said step of applying a plurality of dots of said optical adhesive comprises individually placing each dot of said optical adhesive at selected locations on said lens tissue.

5. The method as recited in claim 1 wherein said step of applying a plurality of dots of said optical adhesive comprises simultaneously placing all of said plurality of dots at selected locations on said lens tissue.

6. The method as recited in claim 1 wherein said step of applying a plurality of dots of said optical adhesive comprises applying dots of UV cement to said lens tissue.

7. The method as recited in claim 6 wherein said step of curing said dots of said UV cement comprises exposing said dots of said UV cement to an ultra-violet illumination source.

8. The method as recited in claim 7 wherein said step of exposing said UV cement to said ultra-violet illumination source comprises exposing said dots of said UV cement to an array of ultra-violet illumination sources such that no shadows are produced on said optical element and said dots of said UV cement.

9. The method as recited in claim 8 wherein said UV cement is exposed to said array of ultra-violet illumination sources for a period of approximately 30 seconds.

10. The method as recited in claim 1 wherein said step of placing said blocking tool, said lens tissue, and said optical element in a debonding solution comprises placing said blocking tool, said lens tissue, and said optical element in a solution of trichlorethylene.

11. The method as recited in claim 1 wherein said step of placing said blocking tool, said lens tissue, and said optical element in a debonding solution comprises placing said blocking tool, said lens tissue, and said optical element in a solution of methylene chloride.

12. The method as recited in claim 1 wherein said step of removing said optical element from said blocking tool and said lens tissue is performed after said blocking tool, said lens tissue, and said optical element have been placed in said debonding solution for approximately 1-2 hours.

13. The method as recited in claim 1 wherein the bottom surfaces of a plurality of said optical elements are placed in a single layer on said lens tissue such that said lens tissue is disposed between said top surface of said blocking tool and said surfaces of said plurality of optical elements.

14. An improved method of securing and removing a surface of an optical element to and front the surface of a blocking tool comprising the steps of:

placing a lens tissue on said surface of said blocking tool, applying a plurality of dots of UV cement to said lens tissue such that said plurality of dots of said UV cement do not contact each other, placing the bottom surface of said optical element on said lens tissue such that said lens tissue is disposed between said surface of said blocking tool and said surface of said optical element, applying pressure to said surface of said optical element such that said surface of said optical element is pressed towards said surface of said blocking took, and such that said plurality of said UV cement dots applied to said lens tissue spread out between said blocking tool and said optical element without contacting each other, exposing said plurality of said UV cement dots to ultra-violet light such that said UV cement cures thereby is securing said optical element to said blocking tool during subsequent machining of said optical element, applying a protective coating around the edges of said optical element and said blocking tool such that fluid present during said subsequent machining of said optical element is prevented from contacting said lens tissue present along said edges of said optical element and said blocking tool placing said blocking tool, said lens tissue, and said optical element in a debonding solution after aid subsequent machining of said optical element so that said cured plurality of UV cement dots are softened, removing said optical element from aid blocking tool and said lens tissue.

15. The method as recited in claim 14 wherein said optical element is secured to and removed from said blocking tool without causing deformation of said optical element.

16. The method as recited in claim 14 wherein said step of applying a plurality of dots of said UV cement comprises individually placing each dot of said UV cement at selected locations on said lens tissue.

17. The method as recited in claim 14 wherein said step of applying a plurality of dots of said UV cement comprises simultaneously placing all of said plurality of dots at selected locations on said lens tissue.

18. The method as recited in claim 14 wherein said step of exposing said UV cement to said ultra-violet light comprises exposing said dots of said UV cement to an array of ultra-violet illumination sources such that no shadows are produced on said optical element and said dots of said UV cement.

19. The method as recited in claim 14 wherein said UV cement is exposed to said ultra-violet illumination sources for a period of approximately 30 seconds.

20. The method as recited in claim 14 wherein said step of placing said blocking tool, said lens tissue, and said optical element in a debonding solution comprises placing said blocking tool, said lens tissue, and said optical element in a solution of trichlorethylene.

21. The method as recited in claim 14 wherein said step of placing said blocking tool, said lens tissue, and said optical element in a debonding solution comprises placing said blocking tool, said lens tissue, and said optical element in a solution of methylene chloride.

22. The method as recited in claim 14 wherein said step of removing said optical element from said blocking tool and said lens tissue is performed after said blocking tool, said lens tissue, and said optical element have been placed in said debonding solution for approximately 1-2 hours.

23. The method as recited in claim 14 wherein the bottom surfaces of a plurality of said optical elements are placed in a single layer on said lens tissue such that said lens tissue is disposed between said surface of said blocking tool and said surfaces of said plurality of optical elements.

* * * * *